L. M. HEERY.

Improvement in Steaming and Cooling Cloth.

No. 4,575. Reissued Oct. 3, 1871.

Witnesses.

J. E. Verry

John Hitz

L. M. Heery, Inventor.

by Geo. E. Brown.

his Atty.

A.H. PHOTO-LITHOGRAPHIC CO. N.Y. (OSBORNE'S PROCESS.)

UNITED STATES PATENT OFFICE.

LUKE M. HEERY, OF HINSDALE, MASSACHUSETTS.

IMPROVEMENT IN STEAMING AND COOLING CLOTH.

Specification forming part of Letters Patent No. 115,200, dated May 23, 1871; reissue No. 4,575, dated October 3, 1871.

*To all whom it may concern:*

Be it known that I, LUKE M. HEERY, of Hinsdale, Berkshire county, Massachusetts, have invented an Improved Apparatus for Steaming and Cooling Cloth, of which the following is a specification:

The first part of this invention relates to that stage of the manufacture of cloth, whether from wool or other material, in which the fabric, after being rolled around a hollow perforated cylinder and covered on the outside with a wrapper, is subjected to the action of steam entering the interior of the cylinder and permeating the roll from the inside, for the purpose of improving or setting the luster of the goods. Heretofore the means used have been such as admitted steam only at one end of the aforesaid perforated cylinder. It is, however, an incident of the employment of steam for this purpose that, unless the cloth is evenly heated, it will not take the dye evenly when it subsequently comes to be colored, but the same piece of goods will be of different hues, and, consequently, of less value than if it were uniform in color. When steam is admitted at one extremity only of the cylinder in most cases the side of the piece that forms the adjacent end of the roll is heated more than the other side. The piece is sometimes doubled lengthwise, so as to bring both selvages together, and then the sides are evenly heated; but in this case the liability is that the center will be less heated, and, consequently, of a different shade. This part of my invention, therefore, consists in an apparatus for steaming the roll at both ends simultaneously for the purpose of evenly heating the cloth, so that its color may be uniform. The second part of my invention relates to a process of forcing water through the roll from the interior of the cylinder, for the purpose of quickly cooling the cloth.

Figure 1:
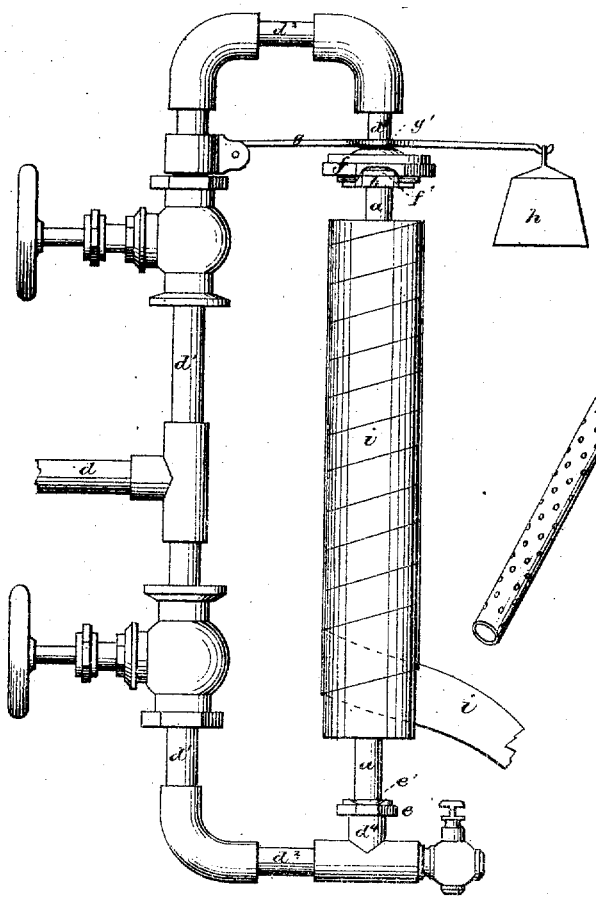
Figure 2:
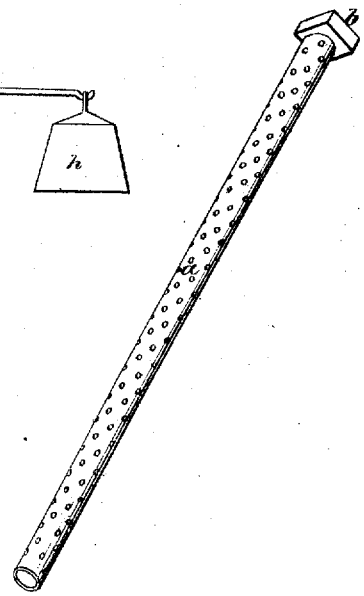

Referring to the drawing, in which Figure 1 is a side elevation of the apparatus with the roll in place, and Fig. 2 a perspective view of the cylinder, *a* is the hollow perforated cylinder, the same having a head, *b*, through which runs a hole continuous with the bore of the cylinder. *d* is the main steam-pipe, and $d^1$ are two branches of the same, extending, the one upward the other downward, both branches being horizontal at $d^2$, and terminating, the upper one in a downwardly-projecting nozzle, $d^3$, and the lower one in an upwardly-projecting nozzle, $d^4$. *e* is a horizontal shoulder on the nozzle $d^4$, near its top. $e'$ is a rubber packing surrounding the upper part of the nozzle $d^4$ and resting on the shoulder *e*. *f* is a block that slides on the nozzle $d^3$. $f'$ is a packing placed below and secured to the said block. The extremities of the nozzles $d^3$ $d^4$ are of a size to fit closely within the ends of the cylinder *a*, which, when placed between them, is necessarily held in a vertical position. A lever, *g*, pivoted at one end to the pipe $d^1$, and bearing an enlargement that has an orifice made through it, by means of which the lever is slipped upon the upper nozzle, plays upon the latter above the block *f*. When the cylinder *a* is in position between the nozzles, with the roll of cloth upon it, a weight, *h*, hung upon the outer end of the lever, presses the block *f* and its packing $f'$ down upon the head *b*, and also presses the lower end of the cylinder down upon the packing $e'$, thus securing steam-tight joints. The roll comes wet from the gig, and, when the steam is let on, it instantaneously causes the water in the cloth to boil out upon the exterior of the wrapper, whence it runs down. The cessation of the outflow of water is the signal for shutting off the steam, and when this is done the cloth is left so nearly dry that, even if allowed to cool simply by evaporation, its moisture will not in the mean time descend into the lower portions of the roll so as to unduly heat them.

Owing to the fact that the steaming of rolls as heretofore accomplished—that is, from one end only—is so liable to produce goods of uneven hues, the steaming process has found little favor, especially among American manufacturers, notwithstanding its comparative cheapness, and no practicable substitute for the old method of boiling rolls had been devised before my invention. This method consists in immersing the rolls, wound on solid cylinders, in a tank of cold water and then heating this to the boiling point either by the injection of steam or by a fire built beneath. This requires from two to four hours, and then the water must be kept boiling for from four to six hours longer, after which the rolls are taken out of the tank and allowed to cool by evaporation, which requires from twelve to eighteen hours longer; and, moreover, during all this time the rolls, if lying horizontally, must be frequently turned partly around, and if standing erect they must be shifted end for end, in order to prevent the water from settling into the lower parts of the rolls and thus unevenly heating them. But with a pressure in the boiler of eighty pounds to the square inch and a conducting-pipe, *d*, of one and a half inch diameter, an equally good result can be accomplished by steaming the roll for from fifteen to thirty seconds. Furthermore, the boiling of rolls in the old way tends to make the cloth tender, whereas the steaming of them has no such tendency. Again, as above stated, when a roll is steamed it may be cooled by evaporation without producing a piece of goods barred or banded in different shades by uneven heating. When, however, there is an abundance of pure water at command, it will not be necessary to wait for the slow cooling of the rolls by evaporation. It is absolutely necessary that the cloth should be cooled before proceeding further in the manufacture, in order that the luster imparted by gigging and steaming may be retained. Therefore, after the steam is shut off, if cold water be forced into the cylinder through the pipes $d$ $d^1$ it will pass through the roll and gush from its exterior, thus thoroughly cooling and also washing the cloth in about a minute's time. Compounds for rendering the goods water proof may also be forced through the roll in the same way.

My improved wrapper consists of a bandage, *i*, of any suitable material, wound spirally around the roll so as to hold evenly every part of it under the pressure of steam. Heretofore the wrapper has been wound straight around the roll or coiled and then tied by encircling strings. A wrapper thus secured does not hold the cloth evenly, and, moreover, the strings leave marks in the cloth which diminish its market value. With the spiral wrapper no strings are required.

I claim as my invention—

1. The mechanism substantially such as is herein described for steaming the roll from both ends at the same time.

2. The process of cooling the roll by forcing cold water through it from the interior of the hollow perforated cylinder by means substantially such as are herein described.

LUKE M. HEERY.

Witnesses:

JAMES W. HEERY,
FRANK MAXWELL.

(24)